D. O. LIVERMORE.
FASTENER FOR THE MEETING RAILS OF SASHES.
No. 11,230. Reissued Mar. 15, 1892.
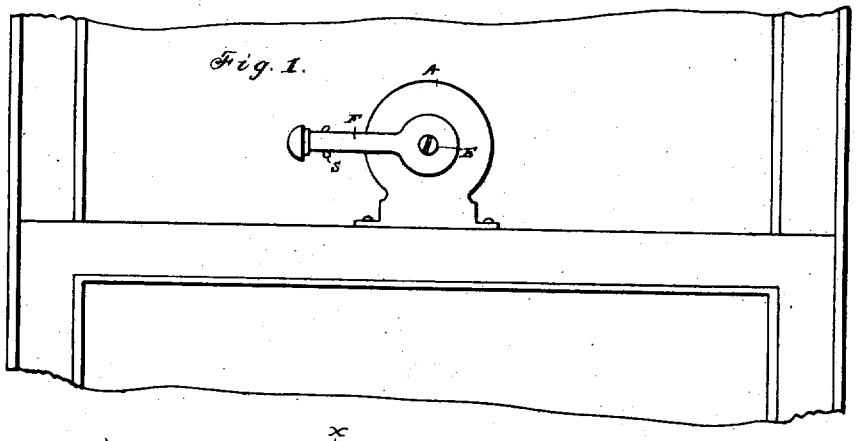
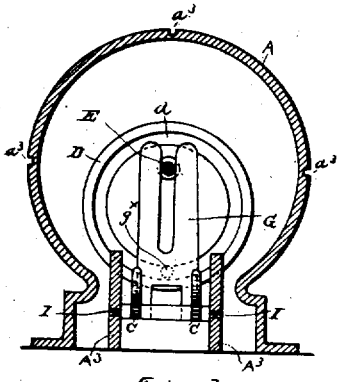
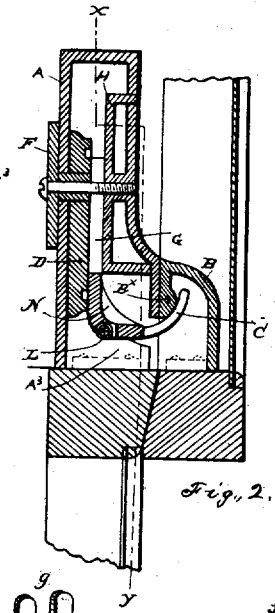
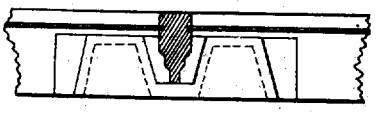
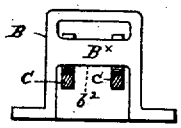
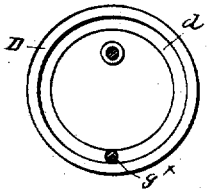
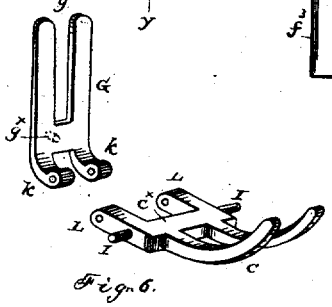
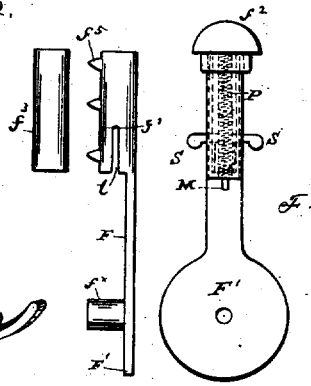
Witnesses.
W. R. Edelen.
C. H. Dorsey
Inventor.
Darwin O. Livermore
By Liggett & Liggett
Attys
THE NORRIS PETERS CO., PHOTO-LITHO., WASHINGTON, D. C.

UNITED STATES PATENT OFFICE.

DARWIN O. LIVERMORE, OF LOS GATOS, CALIFORNIA.

FASTENER FOR THE MEETING-RAILS OF SASHES.

SPECIFICATION forming part of Reissued Letters Patent No. 11,230, dated March 15, 1892.

Original No. 422,953, dated March 11, 1890. Application for reissue filed April 3, 1891. Serial No. 387,556.

*To all whom it may concern:*

Be it known that I, DARWIN O. LIVERMORE, a citizen of the United States, residing at Los Gatos, in the county of Santa Clara and State of California, have invented a new and useful Sash-Lock, of which the following is a specification.

My invention relates to improvements in locks or fastenings for window-sashes; and it consists in a novel construction and combination of parts producing a lock that has several improved features and qualities, all as hereinafter fully described.

This improved lock consists of a locking hook or catch having vertical throw or movement in a curved or angular path and a keeper bar or plate with which said hook engages, these two parts being fastened to the meeting-rails of the two sashes by means of ears and screws in the usual way of securing such fastenings to fit closely together when both sashes are closed.

The construction and operation of these parts will be fully understood from the following description and the accompanying drawings, that form part thereof.

Figure 1 represents the lock in front elevation upon a window having single-pane sashes, or ones without a central strip. Fig. 2 is a side view in vertical section. Fig. 3 is a sectional view taken from the left-hand side of the vertical line $x\ y$, Fig. 2. Fig. 4 is a front view of the keeper-plate for a single-hook lock, and Fig. $4^a$ represents the form of keeper-plate provided for a double-hook lock, where the same is to be applied to a sash having a central strip. Figs. 5, 6, and 7 show separate parts in detail. Figs. 2 to 7, inclusive, are represented on an enlarged scale.

A indicates the case that incloses the locking-hook and operating parts, and B the keeper or part with which the hook engages.

C is the hook, and D is a cam or eccentric to throw it into action. The cam is centered on the screw E and is rigidly connected with a lever F, that has the screw for its center of movement and is set on the outside of the case to move in a vertical arc across the front face. The lever and the cam are fixed together by a hub or a collar $f^\times$ on one part and a central circular aperture in the other part. In the present construction the hub is formed on the lever and sets through an aperture of corresponding size in the case to take the cam on the inside; but these two parts may be united by other means as well.

G is a slide-plate, with a slot $g$ for the center-screw and a stud $g^\times$ on the back to play in the groove $d$ of the cam, and H is a stationary guide-plate, between which and the back of the cam the slide plays up and down. Partial rotation of the cam produces this movement, and the connection between the lever and cam is such that the throw of the lever from one side and horizontal position to the opposite and extreme position sets the slide to its full extent of movement either up or down. The lever should be horizontal both when the locking-hook is thrown out and when it is withdrawn, but at opposite sides of its pivot. The cam may be shaped to act with a less movement, as from the horizontal to a perpendicular position, or in an arc of about ninety degrees; but it is better to have the lever stand in horizontal position, and not upright, when the lock is thrown on. The slide-plate has knuckles $k\ k$ on the bottom to pass inside corresponding knuckles L L on the back of the hook-plate $C^\times$ and form a loose connection or hinge-joint between the two parts. On the sides of plate $C^\times$ are short trunnions I I, which set into the inclined slots N N in the stationary lugs $A^3$ and act on the plate to throw its point upward and outward in a curved path when the slide G is pressed down by its lever. The lugs are cast in one piece with the casing A, and the slots are cut through at the ends to let in the trunnions on the plate $C^\times$.

The bar B, which I have termed the "keeper," can be cast with a bar $B^\times$ to engage the hook, or the front above the edge $b^2$ of the opening may be closed in, so that the point of the hook takes upward into the recess.

Fig. $4^a$ illustrates a form of keeper adapted for an upper sash having a central dividing-strip, which allows the lock to be fixed in the center of the meeting-rail when it is applied to window-sashes of that character. The lock used with this double-recess keeper is furnished with a double hook, as shown in Fig. 6; but for the single keeper a single broad hook can be substituted for the double hook shown in the drawings, as will be readily understood.

A spring-bolt can be applied to the lever to fix it at any point, although the same is not essential to the proper working of the lock. When so applied, the handle of the lever is shaped to ride on the rim of the case, and the bolt M takes into holes or depressions $a^3$.

The handle contains the bolt and a coil-spring P, and is produced by bending or forming the semi-tubular part $f^2$ in one piece with the handle to take the similar semi-tubular part $f^3$, having its top end closed or fitted with an ornamental cap $f^4$. This last-mentioned part holds the spring-bolt and is fixed in place by turning over upon it the clips $f^5$ of the outside part.

To draw the bolt before moving the lever, there are provided the finger-pieces S S, which being fixed to or formed with the bolt are set through slots $t$ in the tubular handle and are drawn toward the end of the handle before the lever is shifted.

As thus constructed and applied my improved lock possesses the quality of resisting attempts to throw it off by introducing an implement through the crevice between the two rails of the sash, and to such extent it may be said to be burglar-proof. It is also easily operated from the room without calling for the application of much strength, and it begins to act as soon as the hook enters under its keeper, so that the two sashes are drawn together, and the upper sash, when not in line with the lower sash, either through shrinking or swelling or other defects, is readily drawn up to place and brought tightly against the lower sash.

What I claim is—

1. In a sash-lock, the combination, with the casing and the operating-lever pivoted to said casing and vibrating in a vertical plane, of the slide-hook moving in a plane at right angles to that of the lever, a slide-plate, and intermediate cam mechanism whereby the hook is connected with and actuated by the movement of the lever, as set forth.

2. In a sash-lock, the combination, with the casing having curved slots and the operating-lever pivoted to said casing and vibrating in a vertical plane, of the hook having trunnions engaging said slots and moving in a plane at right angles to that of the lever, and intermediate devices, substantially as described, whereby the hook is connected with and actuated by the movement of the lever, as set forth.

3. In a sash-lock, the combination, with the operating-lever, of the vertically-movable slide, the hook at the lower end of said slide and adapted to be projected or retracted thereby, and devices, substantially as described, whereby the slide is connected with and actuated by the movement of the lever, as set forth.

4. In a sash-lock, the combination of operating-lever F, moving in a vertical plane, the cam D, slide-plate G, hook-plate $C^{\times}$, and the trunnions and guide-slots, substantially as described.

5. In a sash-lock, the setting-lever having the handle formed of the two semi-tubular portions and the bolt M, spring P, and finger-pieces S, substantially as described.

6. In a sash-lock having locking-hooks that are adapted to operate in a vertical direction and a curvilinear path, a keeper B, having double recesses or sockets with a common base, substantially as described, for the purpose set forth.

7. The combination, with a casing having inclined guides therein and a keeper, of slide and hook plates pivotally connected together, and cam mechanism for actuating the sliding plate, whereby the hook-plate is thrown in or out of the keeper, substantially as set forth.

In testimony whereof I have signed this specification, in the presence of two witnesses, this 21st day of August, A. D. 1890.

DARWIN O. LIVERMORE.

Witnesses:

CHAS. H. DORER,
W. R. EDELEN.